Sept. 1, 1931.  M. B. HOHN  1,821,516
MUSICAL EDUCATIONAL DEVICE
Filed May 29, 1930
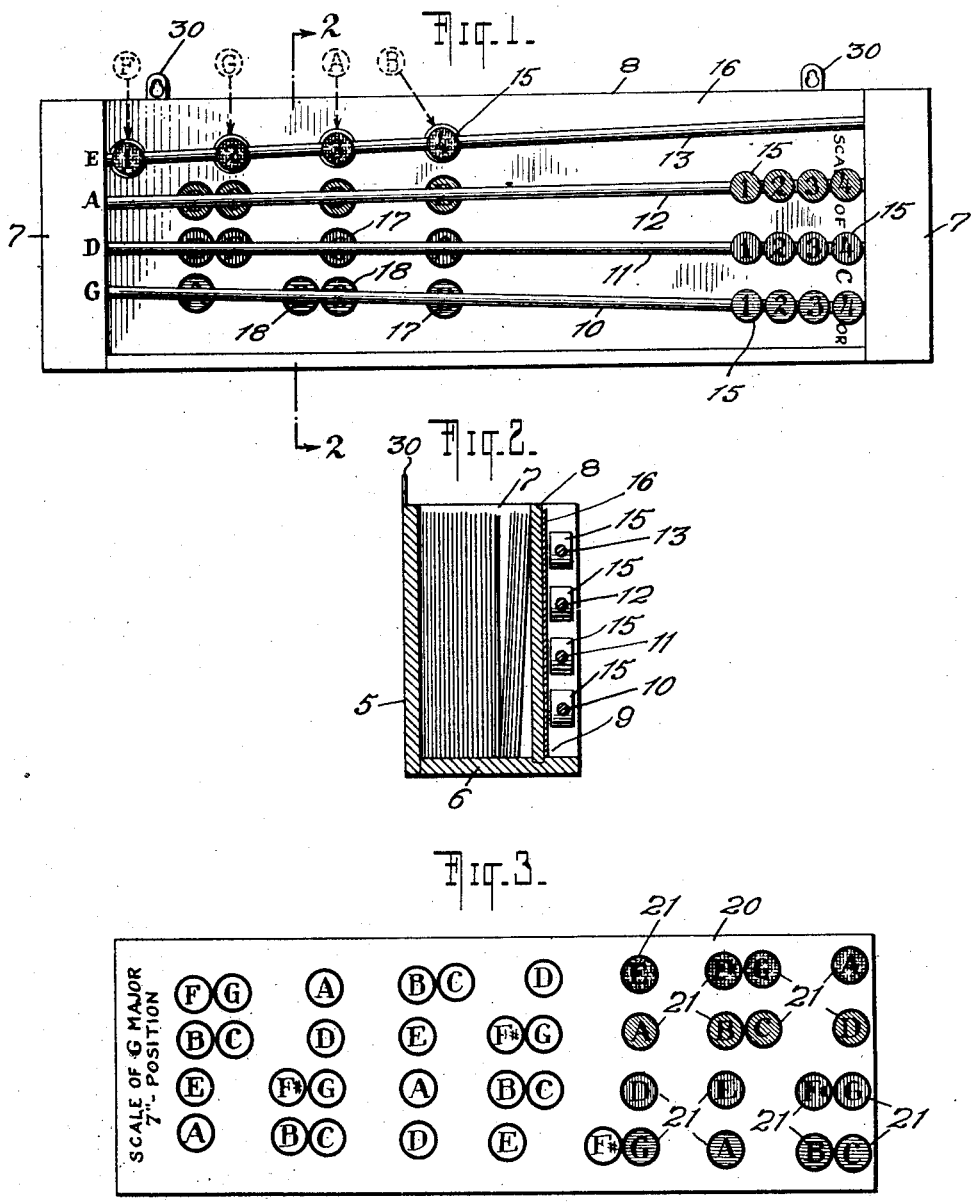
INVENTOR
MAIA BANG HOHN
BY
ATTORNEYS Patented Sept. 1, 1931

1,821,516

UNITED STATES PATENT OFFICE

MAIA BANG HOHN, OF NEW YORK, N. Y.

MUSICAL EDUCATIONAL DEVICE

Application filed May 29, 1930. Serial No. 457,017.

This invention pertains to educational devices, and more particularly to a device especially adapted for aiding in the instruction of young children in performing upon musical instruments of the so-called string type.

It is an object of the invention to provide a mechanical device which will enable a pupil to visualize the various finger positions upon the key or fret-board of a string instrument, thus enabling the pupil more readily to learn the proper finger positions on the key or fret-board.

It is another object of the invention to provide a device of the character above described, which is capable of adjustment to various different positions whereby a visual indication may be had of the proper finger positions in the various musical keys.

A feature of the invention consists in the provision of visual means which represents the strings of the instrument in the use of which the pupil is being instructed.

Another feature resides in the provision of visual means in representation of the key or fret-board of the instrument in the use of which the pupil is being instructed.

Still another feature of the invention resides in visual means mounted upon and movable along the string representing elements to thereby enable the assembling of a visual means which will picturize the several finger positions on the several strings for the proper performance of musical notes and their proper location upon the key or fret-board of the instrument.

Other features of the invention relate to certain novel and improved constructions, arrangements and combinations of parts hereinafter described and particularly pointed out in the claims, the advantages of which will be readily understood and appreciated.

The invention will be clearly understood from the accompanying drawings illustrating the invention in its preferred form, and the following detailed description of the construction therein shown.

In the drawings—

Figure 1 is a view in front elevation of a complete device for aiding in the teaching of music, constructed in accordance with the present invention;

Figure 2 is a transverse sectional view taken on the line 2—2 of Figure 1; and

Figure 3 is a view in elevation of a form of chart employed.

Referring specifically to the drawings, the device as herein illustrated includes a box-like member of rectangular form comprising a rear wall 5, a bottom wall 6, end walls 7 and a front wall 8. As best seen in Figure 2, the front wall 8 is placed somewhat to the rear of the front edges of the bottom and end walls to provide a recessed portion 9 in front of the front wall 8.

Mounted in the forwardly projecting portions of the end walls 7 there are four rigid rods 10, 11, 12 and 13, and in the present embodiment of the invention these rods serve as representations, respectively, of the G string, the D string, the A string and the E string of a violin. It will be noted that these rods are angularly disposed with relation to one another, and that they converge toward the left-hand end of Figure 1 in the same general manner as do the strings of a violin in the direction of the nut end of a violin neck, it being understood that the left-hand end of the device in Figure 1 corresponds to the nut end of a violin neck.

It will be noted, by reference to Figure 2, that the rods 10 to 13 inclusive are spaced with respect to the front wall 8, and this construction permits of mounting markers 15, preferably in the form of circular disks, which are slidable along their respective rods.

The markers correspond to the fingers of the hand which embraces the violin neck, and which are engageable with the violin strings to produce the desired musical notes. For this reason, there are four markers upon each rod and the markers on each rod are numbered 1 to 4 consecutively reading from left to right, and, if desired, the markers on the different rods may be colored, it being understood, however, that the markers on each rod will be of the same color, as indicated in the drawings.

The device includes a plurality of charts, such as 16, of which there are preferably 100 thirty, there being twelve charts for the major scales, twelve for the minor scales, and six position charts. The charts for the major and minor scales are each printed with sixteen areas, such as 17 in Figure 1, arranged in groups of four each, with each group arranged so as to occupy a position behind one of the rods. The field of each of these charts is printed with a dark color, preferably black, with the areas 17 printed in the same color as the markers 15 on the corresponding rod, behind which the areas 17 appear when the charts are in operative position. The areas 17 each bear a letter, such as 18, and these letters 18 indicate the notes of the scale for which the chart is intended.

In Figure 1, one of these charts is shown in position behind the rods 10 to 13, and the particular chart in this instance is the chart which gives the various finger positions on each string for playing the scale of C major. The chart 16 being placed behind the rods as shown, the several markers 15 on the rods are moved to position to register with the various areas 17 behind the several rods, as illustrated upon the rod 13 in Figure 1.

If now the device is so placed as to be in the line of vision of a pupil, a visual picturization of the proper fingers to employ, and the proper positioning thereof upon the strings of a violin, to correctly execute the scale of C major upon a violin will be had.

It will be understood that there will be a chart similar to the one described for each of the major and minor scales, and these charts will all be of substantially the same character, but the several areas 17 will, of course, be differently located upon each chart.

In addition to the twenty-four charts above mentioned, there are, as heretofore stated, six additional charts showing the different positions, there being one chart for each new position. On these position charts, the several areas are printed in groups, that is to say, the position chart which illustrates the second position would have two groups of areas 17, the chart illustrating the third position three groups of areas 17, and so on to the sixth chart which would include seven groups of areas 17. Such a chart, that is one illustrating the seven positions, is illustrated at 20 in Figure 3.

The position charts 20 are each printed in substantially the same manner as are the charts 16 heretofore referred to, except that the areas 21, which designate the new position on each chart, are printed in colors in the manner heretofore described of the areas 17 of the several scale charts, while the remaining areas are of a single color, it being understood that the field is dark or black as heretofore described. For example, a position chart illustrating the second position would, as heretofore stated, have two groups of areas, and it would be the second or right-hand group which would be printed in colors, the first group would be of a single color, for example gray, with the field in a darker color, or black. In Figure 3, in which is shown a chart which illustrates the seventh position, the areas which are printed in colors are designated as 21. Each of the remaining areas, which show the remaining six positions, would be printed in gray and the field in black.

The several charts which are not in use may be conveniently stored in the space between the rear and front walls 5 and 8, respectively, as illustrated in Figure 2, and the device may, if desired, be provided with hangers such as 30 by which the device may be suspended upon a wall or the like.

From the foregoing, it is obvious that the present invention provides a novel device by means of which the proper fingering of the strings of a musical instrument, such as a violin, may be visualized by a pupil, thus materially aiding in the teaching of the proper use of the musical instrument.

While the invention has been herein described as a device for teaching pupils in the proper use of a violin, it is obvious that the principles thereof may be adapted to use in connection with teaching the proper use of other stringed musical instruments.

What is claimed is:

1. A device for teaching music comprising a support having a wall, a plurality of elements mounted on said support in front of said wall, said elements representing a set of strings of a stringed instrument, and a chart insertable between said wall and said string-representing elements and having finger position-indicating means thereon adapted to register with the string-representing elements.

2. A device for teaching music comprising a plurality of elements in representation of a set of strings of a string musical instrument, and means movable to various positions on said string-representing elements for visually indicating which fingers should be used for the particular notes to be played.

3. A device for teaching music comprising a plurality of elements in representation of a set of strings of a string musical instrument, and means cooperating with said string-representing elements for visually indicating finger positions upon the strings of a string musical instrument, said means comprising a plurality of markers movable along the string-representing elements.

4. A device for teaching music comprising a plurality of elements in representation of a set of strings of a string musical instrument, a chart having thereon finger position indications cooperating with said string-representing elements for visually indicating finger positions upon the strings of a string musical instrument, and markers movable relatively to the chart and the finger position indications thereon.

5. A device for teaching music comprising a receptacle-like support having a wall, rods in representation of a set of strings of a string musical instrument carried by said support, a chart insertable between said wall and rods and having finger position-indicating means arranged in groups for registration with said rods, and markers slidable on said rods for registration with said indicating means.

In testimony whereof I have affixed my signature.

MAIA BANG HOHN.